INVENTOR.
GERALD FLEMING
ROBERT G. REED
BY JOHN L. SEUFERT

ATTORNEY

INVENTORS.
GERALD S. FLEMING
ROBERT G. REED, JR.
BY JOHN L. SEUFERT

Richard D. Seibel

United States Patent Office
3,453,620
Patented July 1, 1969

3,453,620
RADOME STRUCTURAL COMPOSITE
Gerald S. Fleming, Ames, Iowa, and Robert G. Reed and John L. Seufert, Tulsa, Okla., assignors to North American Rockwell Corporation
Filed Jan. 29, 1968, Ser. No. 707,351
Int. Cl. H01q 1/42
U.S. Cl. 343—18     12 Claims

ABSTRACT OF THE DISCLOSURE

A sandwich material is provided for substantially transmitting radiation in the ultra high frequency communications band and for substantially absorbing radiation in the radar frequency bands. This material has successive alternating layers of resin bonded glass fabric having essentially zero loss tangent and of honeycomb core with the cells filled with a dielectric material having substantial loss tangent at radar frequencies. The dielectric material is a cured resin with density reducing filler and conductive carbon dispersed therein in a quantity for providing a high dielectric constant and loss tangent.

Background

Many military vehicles and installations have communications equipment operating in the ultra high frequency range. This communication equipment employs antennas for sending and receiving signals. It is customary practice to enclose these antennas in protective structural bodies that are transparent to the radiation which are commonly known as radomes. The radome serves to protect the antenna from the environment and provide a selected exterior geometry for the vehicle; in high speed aircraft or submarines, for example, the radome may be called upon to resist aerodynamic buffeting, extreme pressures, or similar mechanical loads, and also maintain a streamline shape to the exterior of the vehicle.

It is found that antenna dishes and bulkheads behind radomes serve as highly reflective areas for radar and contribute substantially to the enemy's ability to detect and track a vehicle by radar. It is therefore desirable to employ a material for the radome that is transparent in the frequency range of the antenna and provides minimal reflection at radar frequencies so that communications are unimpeded and the vehicle presents a minimal radar target.

Brief summary of the invention

A structural material substantially transparent at communications frequencies and absorptive at radar frequencies is provided by successive alternating layers of a structural material with low loss tangent and a dielectric material with low loss tangent at communications frequencies and high loss tangent at radar frequencies combining to yield low insertion loss for a communication radome and effect lowered radar cross section.

Figure 1:
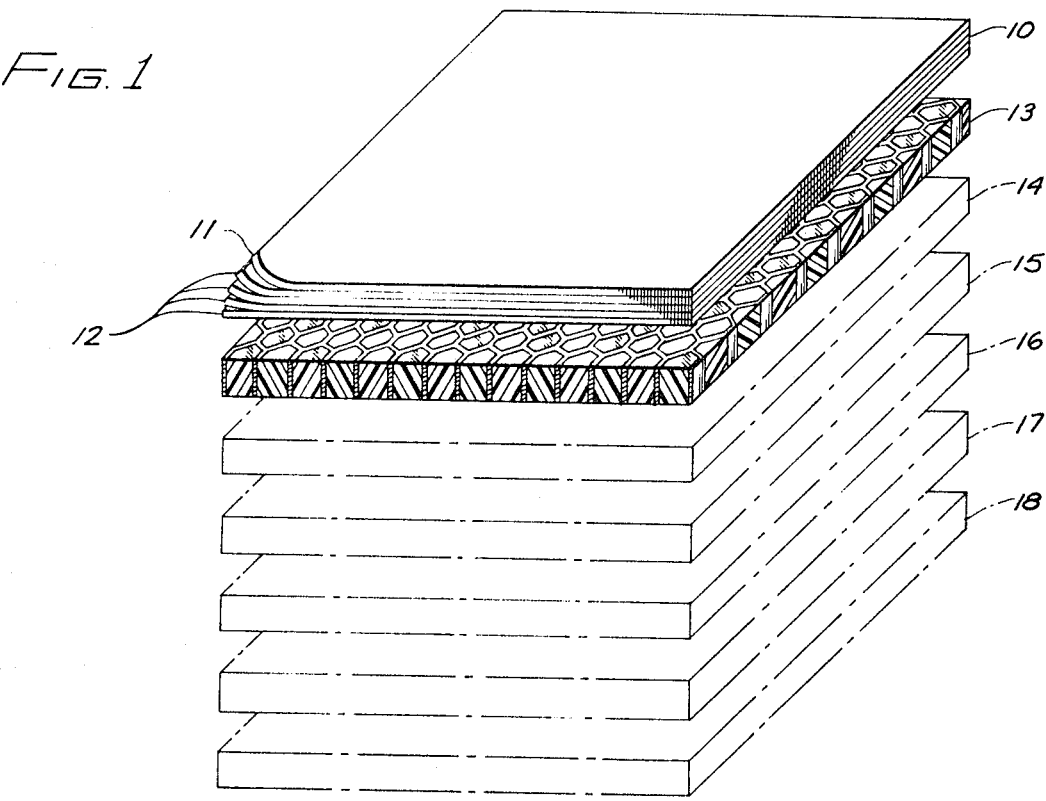
Figure 2:
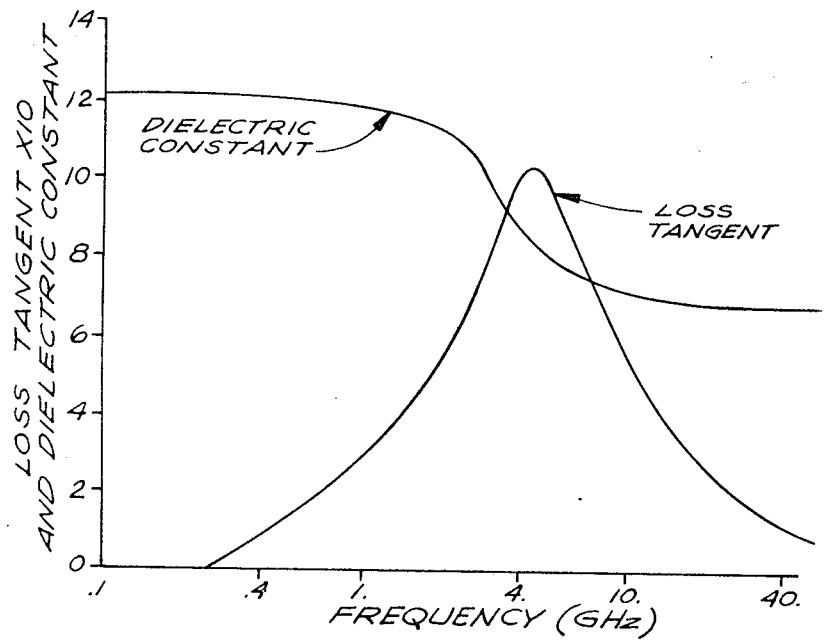
Figure 3:
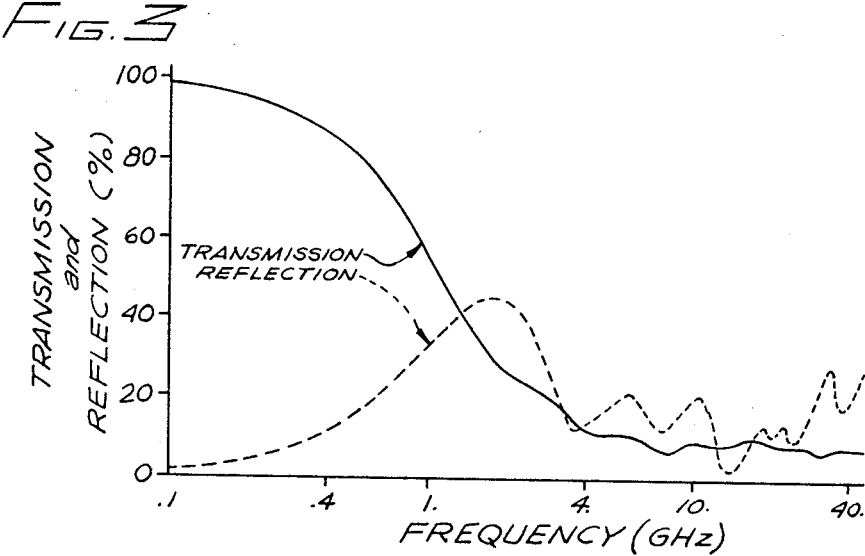

Objects and many of the attendant advantages of this invention will be readily appreciated as the same becomes better understood by reference to the following detailed description when considered in connection with the accompanying drawings wherein:

FIG. 1 illustrates a typical sandwich material as may be employed for constructing a radome;
FIG. 2 comprises a graph of dielectric constant and loss tangent for certain components of the material of FIG. 1; and
FIG. 3 illustrates the transmission and reflection characteristics of a material as provided in the practice of this invention.

FIGURE 1 illustrates a typical material constructed according to the principles of this invention and useful in fabricating a radome that is substantially transparent in the ultra high frequency region and provides substantial attenuation at radar frequencies. This material comprises a plurality of layers which are partially exploded in the view of FIG. 1 to better illustrate the arrangement. Two types of layers are provided in consecutive alteration, that is each pair of one type of layer has one of the other type of layer sandwiched therein. One type of layer provides substantial structural strength and has a low dielectric constant and loss tangent. The other type of layer is electrically lossy with a relatively high dielectric constant and substantial loss tangent at intermediate and higher frequencies as pointed out in greater detail hereinafter.

Thus, as illustrated in FIG. 1, there is provided a first layer 10, which comprises a plurality of epoxy resin impregnated glass fabric sheets known in the art as prepregs. These sheets comprise glass fabric impregnated with an epoxy resin and suitable activators and are cured after assembly of the illustrated sandwich.

A typical epoxy resin for use in this material is one having a viscosity of from 5,000 to 16,000 cps. and an epoxide equivalent of approximatelly 180 to 210 such as is commercially available as Epon 828 from the Shell Chemical Company. Typical activators for the epoxy resin are diaminodiphenylsulfone in an amount of about twenty parts per one hundred parts of resin and boron trifluoromonoethylamine in an amount of about one part per one hundred parts of resin. This type of epoxy resin system is preferred since the glass fabric can be preimpregnated with the resin system and a solvent and the impregnated material completely dried so that the fabric sheets are relatively dry to the touch and are only slightly tacky. It will be readily appreciated that many other epoxy resin and activator systems can be substituted by one skilled in the art or other resin systems such as phenolics, polyimides and the like can be employed.

The first sheet 11 in the layer 10 may, for example, comprise a type 112 glass fabric prepreg the thickness of which is obviously greatly exaggerated in FIG. 1 for purposes of illustration. This sheet 11 comprises an epoxy impregnated fabric about 0.004 inch thick with a thread count of from about 60 to 80 for providing a smooth and impervious outer surface. Next inwardly from the outer sheet 11 are eight layers of 181 glass fabric epoxy prepreg 12. The 181 glass fabric is about 0.009 inch thick with thread count of from about 50 to 60 in a uniform weave. The epoxy impregnated glass fabric layer 10 has a nominal thickness of about 0.08 inch and a dielectric constant of about 4.0. This material has a very low loss tangent (ratio of real and imaginary portions of complex permittivity) and therefore does not attenuate electromagnetic radiation to any substantial extent.

Next inwardly from the outer sandwich layer 10 is a lossy layer 13. This lossy layer comprises a honeycomb core having the cells filled with a lossy material. A typical honeycomb material comprises a conventional high temperature, phenolic resin bonded, fabric honeycomb having a 3/16 inch cell and a density of about 4 pounds per cubic foot. This honeycomb layer is preferably about 0.093 inch thick.

The cells of the honeycomb core are filled with a lossy material to provide attenuation of electromagnetic radiation. A typical filler material comprises 32.0 parts by weight of epoxy resin, about 6.0 parts by weight of hardener for the epoxy resin, about 10 parts by weight of silica microballoons and about 3.75 parts by weight of carbon black. A typical epoxy resin comprises Epon 815 which is substantially the same as Epon 828 hereinabove described with about two percent of phenyl glycyl ether added for lowering the viscosity and slightly flexibilizing the cured epoxy. A typical hardener or activator for the epoxy resin comprises Apco 320 available from Allied Plastics Company and comprises an aliphatic amine and an aromatic amine blended for providing a room temperature cure and somewhat elevated temperature resistance. It will be apparent to one skilled in the art that other types of resin systems and activators can readily be employed by one skilled in the art including other epoxy resins, phenolic resins, polyimides, and the like.

The density of the filler material in the honeycomb core is controlled at a low value for minimum weight of the completed structure by addition of silica glass hollow spheres in the size range of about 30 to 300 microns. In a preferred embodiment about 10 parts by weight of such silica hollow spheres or microballoons are employed in the composition and it is found that from about 8 to 12 parts by weight of silica microballoons can be employed in the lossy material without degrading the structural properties of the composite. The hollow silica spheres are a bulky material of low density and relatively small changes in composition by weight yield substantial changes in viscosity of the resultant mixture. Plastic microballoons or granulated cork are readily employed as density reducing materials in lieu of or in addition to the glass microballoons.

A preferred carbon black comprises a very finely divided acetylene black or conductive oil furnace black such as XC70 or XC72R available from Cabot Carbon Company. The finely divided amorphous carbon particles distributed through the mixture of epoxy resin and microballoons adjusts the dielectric constant and loss tangent thereof to provide attenuation of electromagnetic radiation. The lossy material is preferably mixed by combining the carbon, epoxy resin, and activator by hand or in a mechanical mixer until uniform. The relatively fragile microballoons are then added with only enough mixing to obtain uniformity to avoid excessive crushing of the microballoons. The carbon black is preferably employed in the range of about 3.5 to 4.0 parts by weight in the above described mixture. With a composition in this range there is a maximum insertion loss of about 2.0 db at frequencies at or below 550 mHz. Lower proportions of carbon black have the effect of raising the frequency where the insertion loss is less than 2.0 db, thereby leading to somewhat higher radar reflectivity; and higher proportions of carbon black lower the frequency below which the maximum insertion loss is about 2.0 db.

The dielectric constant and loss tangent of the filled honeycomb material forming the lossy layer 13 are as illustrated in FIG. 2 which shows that the dielectric constant of the layer is high at about twelve throughout the ultra high frequency range and does not drop below ten until S band. In C band and beyond the dielectric constant is about seven. Also shown in FIG. 2 is the loss tangent of the lossy layer 13, which rises in a smooth curve from zero at about 0.2 gHz. ($10^9$ cycles per second) to a maximum of about 1.0 at the about 4 gHz. and drops off in a smooth curve thereafter to about 0.1 around 50 gHz. By having a relatively high dielectric constant at lower frequencies and a relatively lower dielectric constant at higher frequencies combined with a relatively high loss tangent at higher frequencies, appreciable attenuation of higher frequencies is obtained without sacrificing transparency at the lower frequencies as pointed out hereinafter.

Next inwardly from the lossy layer 13 is another structural layer 14 comprising a sandwich of glass fabric prepregs, preferably comprising nine plies of number 181 glass fabric epoxy prepreg as hereinabove described to give a nominal thickness of about 0.08 inch.

Next inwardly from the layer 14 is a lossy layer 15 comprising a honeycomb core having the cells filled with a lossy material as hereinabove described and substantially identical to the lossy layer 13. The thickness of the lossy layer 15 in a preferred embodiment is about 0.093 inch.

Next inwardly from the lossy layer 15 is a lossless structural layer 16 comprising nine plies of number 181 glass fabric epoxy prepreg substantially identical to the lossless layer 14.

Next inwardly from the lossless layer 16 is a lossy layer 17 substantially identical to the lossy layers 13 and 15 hereinabove described.

Next inwardly from the lossy layer 17 is a lossless structural layer 18 comprising eight plies of number 181 glass fabric epoxy prepreg and one ply of number 112 glass cloth epoxy prepreg substantially the same as the first described layer 10.

A radome constructed according to the principles of this invention transmits radiation in the ultra frequency range (up to about 600 mHz.) since the successive layers of the sandwich have relatively low loss tangents and besides are electrically thin, both individually and in combination. In the intermediate frequency ranges (S through X bands) the individual layers are becoming significantly electrically thick as compared with the wavelength of radiation, and the total sandwich is no longer electrically thin. In this range, however, the loss tangent is significant in alternate layers, and in the total sandwich, and substantial attenuation occurs. At the higher frequencies ranges (above X band), the loss tangent of the lossy layers drops off to a lower value, but this is compensated for by the fact that the layers are no longer thin compared with the wavelength of radiation therein and substantial attenuation continues at the higher frequencies. The wavelength of interest for comparing the electrical thickness of the layers is the wavelength in the material rather than free space, and the relatively high dielectric constant in the lossy layers effectively modifies this wavelength. In addition to attenuation in the lossy layers, destructive interference between reflected waves from different layers occurs at higher frequencies wherein the layer thicknesses are no longer electrically thin, thereby leading to further attenuation and a net reflectivity substantially less than that of an unmodified epoxy resin, glass fabric structure. Such wave reflections occur at each interface between dissimilar layers.

To fabricate a radome structure as described and illustrated in FIG. 1 the honeycomb core material has the cells filled with the above described epoxy resin, silica microballoon, and carbon mixture preferably by hand spatula, machine injection or the like. The honeycomb core material provides some structural strength to the very thin layer of lossy material prior to curing and also permits good control of the thickness of the lossy layer by scraping to the honeycomb core.

The glass fabric prepregs forming either the outer layer 10 or in the inner layer 18 are laid over a mold of the desired shape, which may be either a flat surface or some curved mold surface for forming the interior or exterior surface of a radome. If necessary to fit a curve the sheets may be cut and fitted or stretched. After these glass fabric sheets are laid in place a layer of epoxy filled honeycomb core is placed thereon. This is followed by additional layers of glass fabric prepregs and filled honeycomb cores as required to assemble a sandwich as hereinabove described and illustrated in FIG. 1.

After the entire assemblage has been laid up in a conventional manner well known to one skilled in the art, the entire assemblage is vacuum bagged by enclosing in a flexible film which is sealed to the mold around the edges and evacuated. Air pressure acting through the flexible film compresses the above described layers together and holds them in place during curing. If desired, a portion of the assemblage can be assembled and cured and then the balance laid up and cured. The two step procedure has not been found necessary in most cases, however. It is preferred in curing a composite as hereinabove described, to insert the vacuum bagged assembly into a pressure autoclave and maintain a pressure of about 45 p.s.i. across the membrane to assure good contact between the layers and high strength bonding. A typical cure cycle for the above described resins as laid up employs about three hours at 180° F. followed about by four hours at 290° F. The part is then cooled under the 45 p.s.i. pressure until the temperature of the solid laminate is reduced to about 125° F. at which time it can be withdrawn from the autoclave. The pressure and curing cycle slightly compact the materials of construction and the thickness of a sandwich constructed of layers as described and illustrated in FIG. 1 is found to be about 0.56 inch after curing.

Mechanical property tests made on a material as hereinabove described show an average facing stress of about 54,000 p.s.i. is obtained. The core sheer stress is at least 2,370 p.s.i. and the bending rigidity is about 180,600 pounds per square inch for a three inch width of material. The flat wise compressive strength is in excess of 22,500 p.s.i. and the flat wise compressive modulus is about 388,000 p.s.i. These properties provide more than adequate strength in a radome for use in conditions of aerodynamic buffeting, high pressures or the like.

In addition, electrical tests made of a typical material such as provided in the practice of this invention show that this material transmits a major portion of electromagnetic radiation in the ultra high frequency range and attenuates a major portion of electromagnetic radiation in the frequency range of S band and above thereby providing a very low degree of radar reflection. FIGURE 3 illustrates typical transmission and reflection measurements made on a composite material as hereinabove described and illustrated in FIG. 1. This sandwich design has a maximum insertion loss of less than 2.0 db at frequencies at or below about 550 mHz. FIGURE 3 illustrates that the transmission is high in the ultra high frequency range and low in S band and above. Similarly, reflection rises to a maximum in L band and drops off thereabove. The difference between the sum of reflection and transmission is absorption in the above described material and exceeds 70 percent of energy incident thereon above S band. Since reflection is low in search and track radar frequencies, a low radar echo is provided from a radome constructed according to the principles of this invention. Similarly since transmission is also low in these frequencies, little reflection is found from antennas and bulkheads inside the radome. Despite the reduction in radar echo signal, the radome still provides good transmission and minimal attenuation of communication signals in the ultra high frequency range.

Thus, by employing a plurality of electrically thin layers; alternately lossless layers of low dielectric constant, and lossy layers having a high dielectric constant at low frequencies and a lower dielectric constant at higher frequencies and a substantial loss tangent at intermediate frequency; there is provided an antenna cover or radome for transmitting a major portion of electromagnetic radiation in the ultra high frequency range and for attenuation of a major portion of electromagnetic radiation in the frequency range of S band and above.

In addition to the above described variations, it will be obvious that many other modifications of the present invention are possible in light of the above teachings. It is therefore to be understood that within the scope of the appended claims the invention may be practiced otherwise than as specifically described.

What is claimed is:

1. A low pass radar attenuator substantially transparent at relatively lower communications frequencies and substantially opaque at relatively higher radar frequencies comprising:

consecutive layers of first and second types;
said first type of layer having a relatively lower dielectric constant and very low loss tangent; and
said second type of layer having a relatively higher dielectric constant and a loss tangent that is lower at lower communications frequencies and higher at higher radar frequencies so that said radar attenuator has low insertion loss at lower frequency and high absorption at higher frequency.

2. A combination as defined in claim 1 wherein each of at least one type of said layers is electrically thin at lower frequencies and is electrically appreciably thick at higher frequencies.

3. A structural material substantially transparent to electromagnetic radiation in the ultra high frequency range and substantially absorptive to electromagnetic radiation above radar L band frequencies comprising:

a plurality of layers of first and second types in consecutive alternation;
said first type of layers having a relatively lower dielectric constant and a very low loss tangent;
said second type of layers having a relatively higher dielectric constant for effecting wave reflection at interfaces between adjacent layers and having a lower loss tangent in the ultra high frequency range and a higher loss tangent above L band frequencies.

4. A structural material as defined in claim 3 wherein each of said layers is electrically thin in the ultra high frequency range; and wherein
each of at least one type of said layers is electrically appreciably thick at frequencies above C band.

5. A structural material as defined in claim 4 wherein said second type of layer comprises a dielectric material containing dispersed conductive particles for modifying the dielectric constant and loss tangent thereof.

6. A structural material as defined in claim 5 wherein said dielectric material contains a sufficient amount of conductive particles to have a loss tangent greater than two at and above radar L band frequencies.

7. A structural material as defined in claim 5 wherein said dielectric material comprises a cured mixture of bonding resin, density reducing filler, and conductive carbon particles.

8. A structural material as defined in claim 7 wherein said dielectric material comprises about 38 parts by weight of cured bonding resin, in the range of from about 8 to 12 parts by weight of hollow silica microspheres, and in the range of from about 3.5 to 4.0 parts by weight of conductive carbon black.

9. A structural material as defined in claim 8 further comprising a non-metallic honeycomb core having said dielectric material contained in the cells thereof for providing structural strength prior to curing of said bonding resin.

10. A structural material as defined in claim 9 wherein said first type of layer comprises a high strength, resin bonded, glass fiber laminate.

11. A structural material as defined in claim 10 comprising successively:
   an outer structural layer of resin bonded glass fabric sheets;
   a plurality of layers of said second and first types in consecutive alternation; and
   an inner structural layer of resin bonded glass fabric sheets.

12. An integral structural radome including.
   means permitting transmission of electromagnetic energy of communication frequency therethrough; and
   means for concomitantly attenuating electromagnetic energy of radar frequency impinging thereon.

References Cited

UNITED STATES PATENTS

| | | | |
|---|---|---|---|
| 2,636,125 | 4/1953 | Southworth | 343—909 X |
| 2,870,444 | 1/1959 | Broussaud | 343—909 |
| 2,956,281 | 10/1960 | McMillan et al. | |
| 3,315,261 | 4/1967 | Wesch. | |

RODNEY D. BENNETT, JR., *Primary Examiner.*

R. E. BERGER, *Assistant Examiner.*

U.S. Cl. X.R.

343—872